Nov. 17, 1936.   W. H. WEDGER   2,061,297
SHOE AND METHOD OF MAKING SAME
Filed April 1, 1935
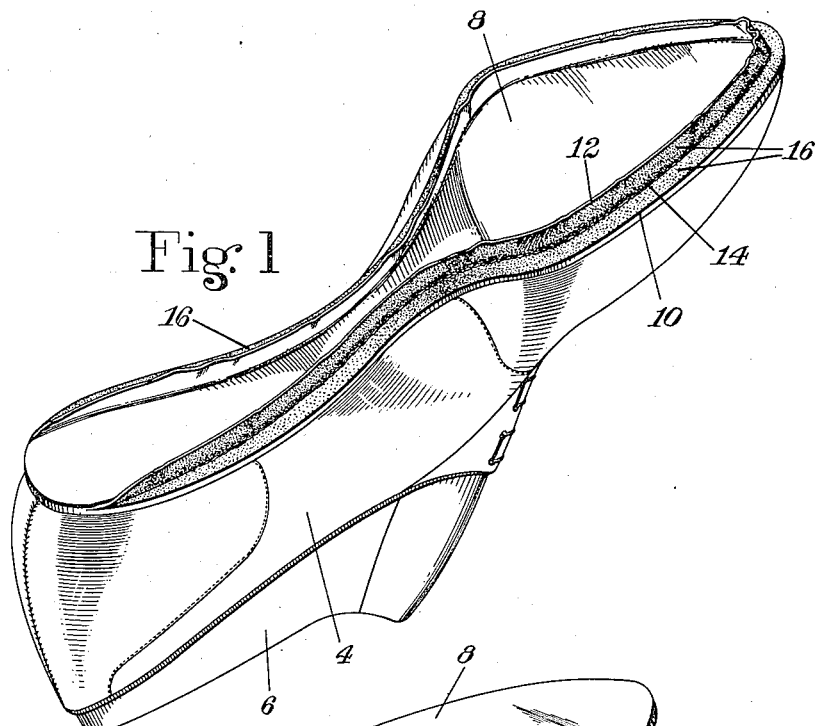
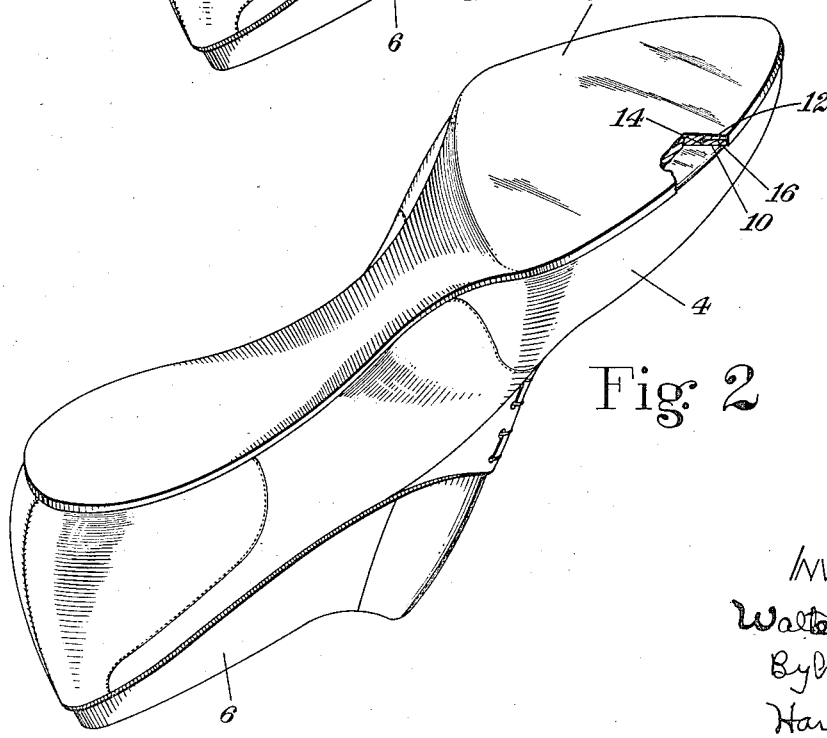

Patented Nov. 17, 1936

2,061,297

UNITED STATES PATENT OFFICE 2,061,297

SHOE AND METHOD OF MAKING SAME

Walter H. Wedger, Belmont, Mass., assignor to Boston Blacking & Chemical Co., Boston, Mass., a corporation of Massachusetts Application April 1, 1935, Serial No. 13,995

8 Claims. (Cl. 12—142)

This invention relates to shoe manufacture, and more particularly to the laying of channel flaps of outsoles after the outsoles have been secured by stitching or other fastenings to the shoe uppers.

In the manufacture of welted and through-and-through stitched shoes it is common practice to cut a peripheral channel in the outsole and to stitch the outsole to the welt or to the shoe bottom by means of stitches lying in the channel. Subsequently, the channel flap is cemented down. The channel construction is also employed in the manufacture of nailed shoes.

While such channeling operations are commonly practiced today, it is nevertheless true that hitherto the channel flaps have frequently come loose after a relatively short period of wear. The unsightly appearance of the shoe resulting from a loose channel flap has frequently been partially corrected by the wearer by severing the channel flap from the sole, even though thereby the advantages of the channel construction are to an extent forfeited.

The aforementioned difficulties in adhesively securing the channel flap in place are due in part to the fact that the adhesive bond of channel flap to channel base must be reasonably waterproof or water-resistant in order to withstand the conditions to which the shoe is subjected in ordinary wear, and to the conditions, unsuitable for best adhesive results with the usual water-resistant cements, under which the channel cementing takes place. Thus, in order to prevent cracking or breaking of the leather of the channel flap the adhesive is ordinarily applied and the channel flap laid while the leather is in temper. As a consequence less favorable adhesive strength and results have been obtained because the adhesives of a waterproof or water-resistant nature heretofore available do not adhere sufficiently well to leather in mulled or tempered condition.

The disadvantages resulting from the relative weakness of adhesive bond are augmented by the continuous bending and other stresses of varying direction and intensity to which the channel joint is subjected during the wearing of the shoe. Moreover, continual striking of the outer edge of the channel flap against objects tends to raise the margin of the flap and initiate as well as to accelerate a general loosening of the channel flap from the channel base.

At the present time, rubber compositions have probably been the most satisfactory, and are the most widely used adhesives for channel flap cementing, in spite of certain disadvantages including the following: Thus, for example, during the edge trimming operation a portion of the rubber employed as channel adhesive is frequently pulled out from between the channel flap and channel base, depriving the channel to this extent of adhesive material and permitting the margins of the channel flaps more readily to loosen and become raised and, furthermore, presenting occasionally a ragged edge appearance. In the resulting trimmed edge the marginal portion of the rubber adhesive in the channel is frequently present and visible as a distinct line which renders the edge of the sole of non-uniform and undesirable appearance. Moreover, such marginally appearing rubber cannot be readily inked during the edge inking operation to produce a uniform edge appearance. A further difficulty is presented in the edge-setting operation wherein the edge-setting iron causes rubber at the outer margin of the channel to become somewhat sticky and gummy, interfering with the attainment of a smooth and uniform sole edge. In addition to the above factors, the rubber cement tends to stretch and to permit the channel flap to pull away somewhat from the channel base whereby the resulting joint is not as tight nor as strong as might be desired.

In view of the difficulties hitherto encountered in the cementing of channel flaps, certain of which have been outlined hereinabove, objects of this invention are to provide an improved laminated shoe structure in which the channel flap is securely and permanently attached to the channel base, and to provide a method of producing such improved shoe structure.

In pursuance of the above and other objects, I have made the discovery that plastic polymerized chloroprene, while greatly resembling rubber in many of its physical and chemical characteristics and properties, nevertheless differs markedly from rubber in its behavior when employed for channel flap cementing, and that polymerized chloroprene may be securely anchored to the substance of the channel flap and channel base while the leather is in temper and caused firmly to unite said channel parts. In view of the disadvantages attending in certain instances the use of the plastic polymerized chloroprene heretofore commercially available, which is markedly malodorant, this invention further contemplates the cementing of channeled outsoles with malodorant-free polymerized chloroprene.

In carrying out this invention in a preferred manner, the cooperating surfaces of the channel flap and channel base of a leather outsole are preferably roughed in a suitable manner, such as by an emery wheel or a wire brush, or the channeling may be done in the first place in such a manner as to provide surfaces suitable for cementing. Then, after the outsole has been secured to a welted or other shoe bottom by stitching disposed in the channel, and while the leather is in temper, a polymerized chloroprene adhesive composition consisting essentially of plastic polymerized chloroprene, preferably malodorant-free polymerized chloroprene, dissolved in a suitable solvent, e. g., equal parts of benzene and tri-chlorethylene, is applied to the cooperating surfaces of the channel flap and the channel base, whereupon the polymerized chloroprene from the applied composition becomes anchored to the substance of the channel flap and channel base. The application of the polymerized chloroprene composition may be by brush, by extrusion, or in any other suitable manner. Preferably an accelerator is associated with the polymerized chloroprene, before, during, or after the application of the latter to the channel surfaces.

The applied composition is then dried or permitted to dry for a sufficient length of time to remove a major portion of the solvent, whereupon the channel flap and channel base, which are still in temper, are brought together under attaching pressure, either momentarily or for a longer period. The minimum drying period before the parts are brought together will depend in part upon the volatility of the solvent employed, but ordinarily, for example, for solvents such as benzene and tri-chlor-ethylene, a drying time of not more than about one hour is necessary before the parts may be brought together under attaching pressure. On the other hand, the adhesive may be permitted to dry for as much as 8 to 12 hours before laying the channel, without adversely affecting the strength of the bond. The laying of the channel conveniently may be accomplished by means of a channel-flap-laying machine such as disclosed in United States Letters Patent No. 981,190, granted January 10, 1911, on an application filed in the name of John B. Hadaway. In order to assure the formation of an adhesive bond of exceptionally great strength, the assembled channel flap and channel base may be maintained under pressure for any desired time, for example, one minute, in a pressing machine such as shown in United States Letters Patent No. 1,946,490, granted February 13, 1934, on an application filed in the name of Sidney J. Finn.

As previously stated, the adhesive composition preferably employed in carrying out this invention consists essentially of a solution of plastic polymerized chloroprene in a suitable solvent. The polymerized chloroprene preferably is malodorant-free. Additionally there may be present in the composition ingredients to modify and improve the characteristics thereof, as well as to accelerate the curing or more complete polymerization of the chloroprene. A specific example of a preferred composition is as follows:

300 grams plastic polymerized chloroprene (deodorized)
15 grams wood rosin
30 grams magnesium oxide
15 grams zinc oxide
6 grams sulphur
8 grams phenyl-beta-naphthylamine
3 grams tetramethyl-thiuram-monosulphide
630 cc. benzene
630 cc. tri-chlor-ethylene The above composition may be prepared by milling together the polymerized chloroprene, wood rosin, magnesium oxide, zinc oxide, and phenyl-beta-naphthylamine and then dissolving the resultant milled solid material, together with the sulphur, in a mixture of the solvents, benzene and tri-chlor-ethylene. The tetramethyl-thiuram-monosulphide may be dissolved in the resulting solution or may be previously dissolved in a portion of the solvent.

In the above composition the polymerized chloroprene is, of course, the adhesive material. Preferably the polymerized chloroprene is malodorant-free, which may be prepared, for example, by deodorizing commercial plastic polymerized chloroprene in the manner set forth in an application for United States Letters Patent, Serial No. 755,852, filed December 3, 1934, in the name of A. D. Macdonald. The wood rosin is a softener for the polymerized chloroprene. The magnesium oxide serves, at least in part, to neutralize any hydrochloric acid which may be set free in the polymerized chloroprene, and to prevent scorching when zinc oxide and polymerized chloroprene are milled together. The zinc oxide appears to assist in the curing or more complete polymerization of the polymerized chloroprene. The sulphur appears to assist in the later curing of the polymer. The phenyl-beta-naphthylamine functions as a stabilizer to inhibit premature curing of the polymer. The tetramethyl-thiuram-monosulphide is an accelerator and serves to initiate the rapid curing or completion of the polymerization of the polymerized chloroprene, and for this reason is preferably added to the composition not too long prior to the actual application of the composition to the channel parts, for example, not more than 24 hours prior to the time the composition is used. By reason of the presence of the accelerator, the plastic polymerized chloroprene more readily becomes cured or polymerized beyond the plastic stage. The benzene and tri-chlor-ethylene function, of course, as solvents for the polymerized chloroprene and associated materials.

It is to be understood that the above composition is given merely by way of specific example and that the invention is in no way limited thereto. Thus, the composition might consist merely of polymerized chloroprene and a solvent therefor. Furthermore, with respect to the preferred type of composition given above, other softeners might be employed in place of wood rosin, for example, gum rosin, cumar resin, and other natural and synthetic resins. The magnesium and zinc oxides and sulphur might be omitted or replaced with equivalent materials. Where keeping qualities are not important, the phenyl-beta-naphthylamine might be omitted. Furthermore, where slow curing is satisfactory, the accelerator tetramethyl-thiuram-monosulphide might be omitted and where acceleration is desired other accelerators than tetramethyl-thiuram-monosulphide may be employed. Other solvents may be employed in place of benzene or tri-chlor-ethylene or in association therewith, for example, carbon tetrachloride, toluene, xylene.

The accompanying drawing illustrates the manner of carrying out my invention and the shoe structure produced thereby; and in the drawing Figure 1 is a perspective view of a lasted shoe showing the adhesive applied to the channel flap and channel base; and Fig. 2 is a perspective view showing the shoe after the channel has been laid.

In Fig. 1, which illustrates a lasted shoe wherein an outsole has been attached to an upper by through-and-through stitching, there is shown a shoe upper 4 mounted on a last 6. The leather outsole 8 has been marginally channeled to provide a channel base 10 and a channel flap 12. The flap 12 is shown in laid-back position. The through-and-through stitching 14 which secures the outsole 8 to the bottom of the shoe upper 4 may be seen in the channel at the junction of the channel base 10 and channel flap 12. Polymerized chloroprene adhesive 16 is shown on the cooperating or meeting surfaces of the channel base 10 and channel flap 12.

Fig. 2 illustrates the advantageous shoe structure formed by this invention. The channel flap 12 is held securely to the channel base 10 by means of the malodorant-free polymerized chloroprene adhesive layer 16. In the cut-away section in Fig. 2 may be seen a portion of the sole-attaching stitching 14 which is concealed from view in the finished shoe by means of the channel flap 12.

It should be noted that by means of my invention there is produced a laminated shoe structure having advantageous characteristics hitherto not obtained. After the channel has been laid in accordance with this invention, the shoe may be carried through subsequent factory operations, such as edge trimming, inking and polishing, without any "pulling out" of the adhesive to weaken the strength of bond and without dulling or gumming up of tools, and furthermore, the appearance of the finished sole edge is uniform and pleasing in appearance.

Not only does my invention lend itself to ease of factory manipulation and pleasing appearance but the strength and wearing qualities of the resulting shoe structure are greatly enhanced. The bond of channel flap to channel base is waterproof and tight and there is no yielding between the parts. Moreover, there is no stiffening effect and the resulting structure is flexible. Furthermore, the adhesive union is permanent and the channel flap remains securely bonded to the channel base and in tight relation thereto throughout the life of the sole and in effect constitutes the substance of the channel flap again an integral part of the outsole such that the entire outsole will wear uniformly in the manner of an outsole which had not been channeled, thus eliminating the unsightly appearance of loosened channel flaps hitherto so frequently encountered. Moreover, according to a preferred form of the invention, the resulting shoe structure is free from any malodorant characteristics which might otherwise limit the use of the invention.

A form of polymerized chloroprene suitable for the purposes of this invention is the synthetic rubber-like material known commercially as "DuPrene", and which may be made by polymerizing chloroprene in the manner set forth in United States Letters Patent No. 1,950,436, granted March 13, 1934, upon an application of Ira Williams. The chloroprene itself may be made in the manner described in United States Letters Patent No. 1,950,431, granted March 13, 1934, upon an application of W. H. Carothers and A. M. Collins. So far as applicable to the purposes of this invention, other haloprenes are to be considered as equivalents of chloroprene, for example, bromoprene, described in said Patent No. 1,950,431. Malodorant-free polymerized chloroprene, and a method of deodorizing "DuPrene" is disclosed in application Serial No. 755,852, hereinbefore referred to.

Having described my invention, what I claim as new and desire to secure by Letters Patent of the United States is:

1. A shoe comprising an upper, a leather outsole channeled to form a channel flap and channel base, stitching disposed in the channel of said outsole and securing said outsole to said upper, and malodorant-free polymerized chloroprene anchored to the substance of and adhesively securing the channel flap to the channel base.

2. In the manufacture of shoes, the method of laying a channel flap on a leather outsole which comprises applying malodorant-free polymerized chloroprene to the cooperating surfaces of the channel flap and channel base and anchoring said polymerized chloroprene securely to the substance of said channel flap and channel base, respectively, and, before the polymerized chloroprene has become cured, bringing the channel flap and channel base into juxtaposition and under attaching pressure.

3. In the manufacture of shoes, the method of laying a channel flap on a leather outsole which comprises applying polymerized chloroprene and an accelerator to the cooperating surfaces of the channel flap and channel base while said channel flap and channel base are in temper and anchoring said polymerized chloroprene securely to the substance of said channel flap and channel base, respectively, and, while said channel flap and channel base are still in temper and before said polymerized chloroprene has become cured, bringing the channel flap and channel base into juxtaposition and under attaching pressure.

4. In the manufacture of shoes, the method of laying a channel flap on a leather outsole which comprises applying a solution of polymerized chloroprene to the cooperating surfaces of the channel flap and channel base and permitting the polymerized chloroprene from said solution to become securely anchored to the substance of said channel flap and channel base, respectively, removing the greater part of the solvent portion of said solution, and, before the polymerized chloroprene has become cured, bringing the channel flap and channel base into juxtaposition and under attaching pressure.

5. The method of laying a channel on a leather shoe sole which comprises depositing on the cooperating surfaces of the channel flap and channel base plastic polymerized chloroprene from a solution thereof in a mixture of benzene and trichlor-ethylene, removing a major portion of the solvent, and, before the polymerized chloroprene has become cured, bringing the channel flap and channel base into juxtaposition and under pressure.

6. A shoe comprising an upper, a leather outsole channeled at the periphery thereof to form a channel flap which includes a portion of the wearing surface of the outsole, attaching means disposed in the channel and securing said outsole to the upper, and malodorant-free polymerized chloroprene securing said channel flap to the channel base to constitute the substance of the channel flap in effect an integral part of the outsole such that the entire outsole will wear uniformly in the manner of an outsole which had not been channeled.

7. In the manufacture of shoes, the method of laying a channel flap on a tempered leather outsole after attaching means have been disposed in the channel to secure the outsole to the shoe upper, which method comprises disposing plastic polymerized chloroprene between the channel flap and channel base and pressing said parts together to form a sole structure integral in the sense that the entire sole will wear uniformly in the manner of an outsole which had not been channeled.

8. In the manufacture of shoes, the method of laying a channel flap on a leather outsole which comprises applying a solution of polymerized chloroprene to the cooperating surfaces of the channel flap and channel base while said channel flap is in temper, removing a major portion of the solvent, and while said channel flap is in temper bringing the channel flap and channel base into juxtaposition and under attaching pressure.

WALTER H. WEDGER.